US009855855B1

(12) United States Patent
Cory et al.

(10) Patent No.: US 9,855,855 B1
(45) Date of Patent: Jan. 2, 2018

(54) REGENERATIVE POWER ELECTRONICS

(71) Applicant: HARRIS CORPORATION, Melbourne, FL (US)

(72) Inventors: Mark A. Cory, Merritt Island, FL (US); Loran J. Wilkinson, Palm Bay, FL (US); Matthew D. Summer, Melbourne, FL (US); Paul M. Bosscher, West Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 91 days.

(21) Appl. No.: 15/191,239

(22) Filed: Jun. 23, 2016

(51) Int. Cl.
| | |
|---|---|
| *H02J 7/14* | (2006.01) |
| *B60L 11/00* | (2006.01) |
| *B60L 11/18* | (2006.01) |
| *H02J 7/00* | (2006.01) |

(52) U.S. Cl.
CPC .......... *B60L 11/1861* (2013.01); *H02J 7/007* (2013.01); *H02J 7/0026* (2013.01); *H02J 2007/0098* (2013.01)

(58) Field of Classification Search
CPC ........................... B60L 11/1861; H02J 7/0026
USPC ............................................. 320/104; 701/22
See application file for complete search history.

(56) References Cited

U.S. PATENT DOCUMENTS

| | | | |
|---|---|---|---|
| 5,291,960 A | 3/1994 | Brandenburg et al. | |
| 7,977,918 B2 | 7/2011 | Nam et al. | |
| 9,048,482 B2 | 6/2015 | Lentine, Jr. et al. | |
| 2011/0264317 A1* | 10/2011 | Druenert | B60K 6/48 701/22 |
| 2013/0147433 A1* | 6/2013 | Chen | H02J 7/0013 320/112 |
| 2015/0239365 A1* | 8/2015 | Hyde | B60L 11/1861 701/2 |

* cited by examiner

*Primary Examiner* — M'Baye Diao
(74) *Attorney, Agent, or Firm* — Fox Rothschild LLP; Robert J. Sacco; Carol E. Thorstad-Forsyth

(57) ABSTRACT

A method for controlling the charging of a battery panel of a remote vehicle using regenerative power includes continuously monitoring a state of charge of each of a plurality of smart batteries included in a battery panel and detecting a regenerative current flow from a motor of a vehicle. The method also includes determining if a current charge status of a smart battery in the plurality of smart batteries is at a charge condition which is less than a threshold value associated with the smart battery and determining a plurality of optimal voltage differentials to be applied across each of the plurality of smart batteries. Each of the plurality of optimal voltage differentials is used to control a charging current supplied to a corresponding smart battery. The method further includes applying the determined plurality of optimal voltage differentials across each of the corresponding plurality of smart batteries.

21 Claims, 5 Drawing Sheets

REGENERATIVE POWER ELECTRONICS

BACKGROUND OF THE INVENTION

Statement of the Technical Field

The inventive arrangements relate to controlling battery recharging using regenerative vehicles in remote vehicles, and in particular, to a system which permits charging of multiple smart batteries that are connected in parallel.

Description of the Related Art

Many remote vehicles such as, for example, mobile robots or unmanned vehicles, include rechargeable power sources. The rechargeable power sources can include, for example, one or more batteries such as lithium-ion batteries (e.g., a BB-2590/U battery). The remote vehicle and the rechargeable power source may be configured to regenerate energy from otherwise-wasted vehicle momentum, and then later recycle to drive the vehicle.

Generally, electric vehicles (including electric vehicles that regenerate power from vehicle momentum) require configuring long strings of batteries in parallel or series to meet the energy requirements of driving the vehicle. The batteries are typically connected to a single battery management system with direct access to each of the batteries. In an electric vehicle that regenerates power, the single battery management system is configured to absorb the power produced during regenerative braking to uniformly charge each of the batteries. This process commonly involves use of an ultracapacitor to store energy associated with large current variations and surges, which are commonly associated with regenerative charging. Individual batteries in such a battery pack cannot be replaced or swapped.

However, batteries used in unmanned systems, such as the BB-2590 Lithium-ion battery, are designed to be a multi-purpose military smart battery with its own "smart" battery management system. Furthermore, multiple such smart batteries are often configured in parallel and used to power various devices and systems. When batteries are configured in parallel (such as the BB-2590 batteries in an unmanned vehicle), their cells do not typically perform uniformly and have a limit to the amount of charge that they can each absorb, which makes absorbing power produced during regenerative braking complicated. For instance, fully charging one battery cell in a battery pack and continuing to charge it may result in overcharging and damage to the fully charged cell. Likewise, ending a charge cycle when only one battery cell is fully charged may result in undercharging one or more of the other battery cells in the battery pack. A further challenge associated with unmanned vehicles is that they tend to be relatively small lightweight systems. In such scenarios an ultracapacitor is not particularly practical because of the relatively large size and weight associated with such devices.

Moreover, an unmanned vehicle or robot may utilize several different smart battery types, wherein each battery type can have different size, shape, and voltage requirements. In such scenarios, the multiple smart batteries also do not utilize a single battery management system. Instead, each battery may have its own recharging capability (if present) and management system which much be individually activated.

Smart batteries have very stringent limits with respect to the maximum charging current they can be subjected to, and have inbuilt protection mechanisms to create a fault condition when subjected to a sudden influx of charge. In a regenerative charging system, available current for charging can vary rapidly, unpredictably and substantially. Accordingly, there is a need for a system in an unmanned vehicle that enables optimal controlled distribution of available regenerative charging current among an array of smart batteries.

SUMMARY OF THE INVENTION

Embodiments of the invention concern a method for controlling the charging of multiple smart batteries in a battery panel of a remote vehicle using regenerative power. The method is comprised of continuously monitoring a state of charge of each of a plurality of smart batteries included in a battery panel and detecting a regenerative current flow from a motor of a vehicle. The method also includes determining if a current charge status of a smart battery in the plurality of smart batteries is at a charge condition which is less than a threshold value associated with the smart battery and determining a plurality of optimal voltage differentials to be applied across each of the plurality of smart batteries. Each of the plurality of optimal voltage differentials is used to control a charging current supplied to a corresponding smart battery. The method further includes applying the determined plurality of optimal voltage differentials across each of the corresponding plurality of smart batteries.

Embodiments also include a battery recharging control system. The system is comprised of a motor configured to supply regenerative current for recharging one or more of a plurality of smart batteries included in a battery panel, and a control circuit for selectively controlling the recharging of one or more of the plurality of smart batteries. The control circuit can be configured to continuously monitor a state of charge of each of the plurality of smart batteries, detect a regenerative current flow from the motor, determine if a current charge status of a smart battery in the plurality of smart batteries is at a charge condition which is less than a threshold value associated with the smart battery, and determine a plurality of optimal voltage differentials to be applied across each of the plurality of smart batteries. Each of the plurality of optimal voltage differentials can be used to control a charging current supplied to a corresponding smart battery. A plurality of regulator circuits associated with each of the plurality of smart batteries are also provided, and are communicatively coupled to the control circuit. Each of the plurality of regulator circuits is configured to control a charge current supplied to the associated smart battery.

BRIEF DESCRIPTION OF THE DRAWINGS

Embodiments will be described with reference to the following drawing figures, in which like numerals represent like items throughout the figures, and in which.

DETAILED DESCRIPTION

Figure 1:
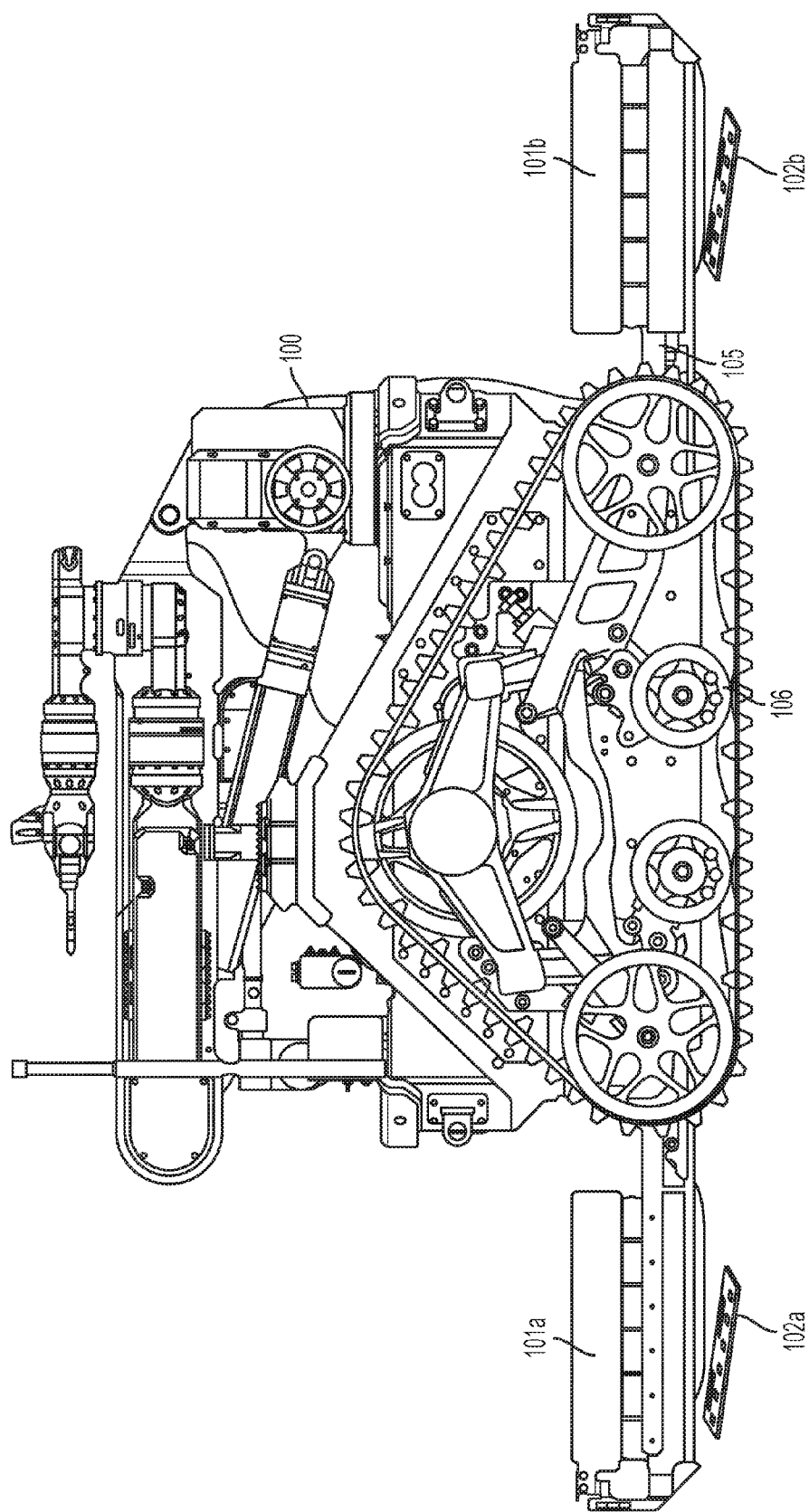
FIG. 1 illustrates an example unmanned vehicle that includes the recharging control system, according to an embodiment.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The terminology used in this description is for the purpose of describing the particular versions or embodiments only, and is not intended to limit the scope.

As used in this document, the singular forms "a," "an," and "the" include plural reference unless the context clearly dictates otherwise. Unless defined otherwise, all technical and scientific terms used herein have the same meanings as commonly understood by one of ordinary skill in the art. All publications mentioned in this document are incorporated by reference. All sizes recited in this document are by way of example only, and the invention is not limited to structures having the specific sizes or dimensions recited below. As used herein, the term "comprising" means "including, but not limited to."

The following terms shall have, for purposes of this application, the respective meanings set forth below:

An "unmanned system" refers to a device or vehicle without a human operator on board. Example unmanned systems may include, without limitation, unmanned ground vehicles (UGVs), unmanned aerial vehicles (UAVs), unmanned surface vehicles (USVs), unmanned underwater vehicles (UUVs), driverless cars, driverless trains, robots, and/or the like.

A "manned system" refers to a device or vehicle having a human operator on board.

The term "regenerative braking" refers to the conversion of a moving object's kinetic energy into chemical energy stored in a battery, where it can be used later to drive the object. A regenerative braking unit may comprise a traction motor that is used to slow or to stop a vehicle. For example, the regenerative braking unit may act as a generator that converts mechanical energy of wheel rotation into electrical energy, during for example, braking or deceleration.

As used herein, "circuit" means a group of electrically connected components sharing a common set of compatible electrical characteristics. It should be appreciated that within a circuit, various commonly known electrical distribution equipment may be incorporated such as, but not limited to, load panels, circuit breakers, switches, contactors and the like may be used to further control and manage the flow of electrical power. Various components (or modules) of the circuit described below may be a hardware device (or collection of hardware devices) that include a memory and a processor and/or a software module. The memory is configured to store information (such as data, control logic, or the like) and the processor is specifically configured to execute instructions to perform one or more processes which are described further below. Furthermore, control logic (including instructions for performing one or more functions) of the present disclosure may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

FIG. 1 illustrates an example unmanned vehicle that includes a recharging control system, according to an embodiment. As illustrated by FIG. 1, the unmanned vehicle 100 includes one or more battery panels 101a and 101b. For convenience, the battery panels shown in FIG. 1 are shown in their extended configuration where they are disposed external of the unmanned vehicle 100. In this configuration, the battery panels are easily accessible for servicing of the batteries. Under normal operating conditions, the panels can be retracted into battery compartments within the unmanned vehicle 100 so that they do not interfere with unmanned vehicle operations.

The one or more battery panels 101a and 101b are connected to the electric motor of the vehicle 100 (not shown). The vehicle electric motor provides regenerative braking to charge the one or more battery panels 101a and 101b, and the one or more battery panels 101a and 101b provide current to drive the vehicle electric motor. The motor can include a control unit that switches the motor so that it can be used to drive the vehicle when battery power is sufficient, and then return to charging the battery panels when braking or deceleration of the vehicle occurs. In an embodiment, vehicle 100 includes a chassis 105 having front and rear ends that supports the one or more battery panels 101a and 101b. Multiple drive assemblies 106 may support the chassis 105.

In an embodiment, each of the one or more battery panels 101a and 101b can include one or more smart batteries (e.g., a BB-2590 which is both replaceable and rechargeable) connected in parallel. Other example batteries are within the scope of this disclosure. In an embodiment, one or more battery panels may be connected in series with each other. In an embodiment, each of the battery panels may include more than one type of battery connected in parallel. A smart battery includes a non-volatile memory, and one or more processing elements configured to measure or control aspects of the smart battery. The one or more processing elements can be configured to monitor and control charging operations of one or more battery cells which comprise the smart battery. The one or more processing elements can also control the current which is discharged from the smart battery to help ensure that one or more desired battery operating parameters are satisfied. Each smart battery has its own activation module and must be individually activated before recharging of the smart battery can begin. Examples of smart batteries include without limitation, BB-2590, BB-2847, or the like. A smart battery may monitor modify store and/or report aspects of the battery power to an internal and/or external control system.

Each of the one or more battery panels 101a and 101b also includes a control system (102a and 102b, respectively) that controls the absorption of power (i.e., charging of the battery panels) by the battery panels during regenerative braking. The control system can be one or more devices such as a processor, an application specific circuit, a programmable logic device, a digital signal processor, or other circuit programmed to perform the functions described as follows. In an embodiment, the one or more smart batteries are replaceable and hence characteristics such as voltage, charge, etc. of the batteries may vary from one battery to another when a battery in the battery panel is replaced and/or removed.

Figure 2:
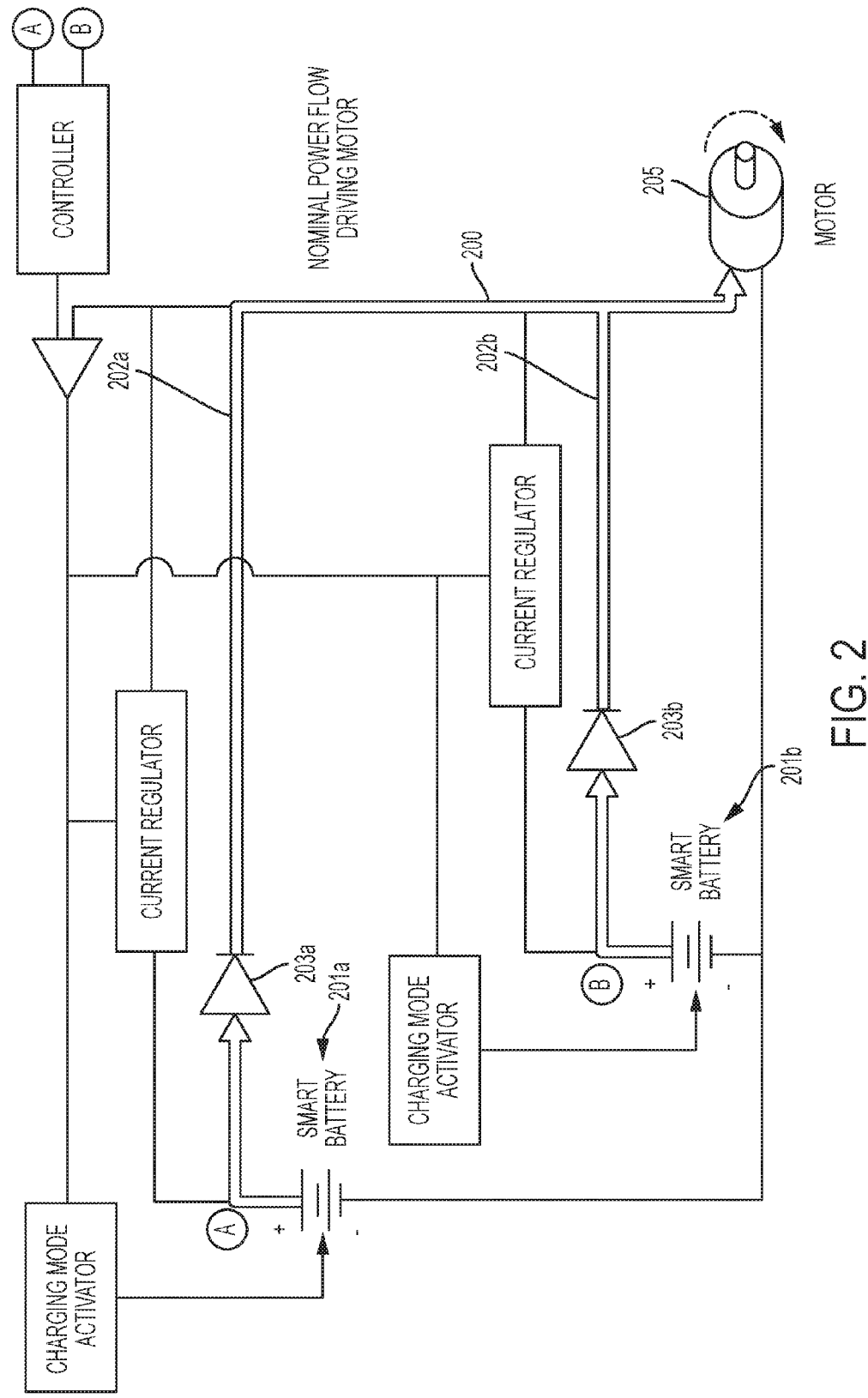
FIG. 2 illustrates an example block circuit diagram of the control system when a battery panel is providing power to the motor for driving a vehicle, according to an embodiment.

FIG. 2 illustrates an example block circuit diagram 200 of a control system when a battery panel is providing power to the motor for driving a vehicle. As shown in FIG. 2, when the battery panel is providing power to the motor, current flows from the individual batteries (201a and 201b) in the battery panel to the motor 205, via paths 202a and 202b. In an embodiment, the individual batteries (201a and 201b) are smart batteries. In an embodiment, the paths 202a and 202b can include diodes 203a and 203b to ensure that the driving current only flows in one direction. i.e. towards the motor 205. In an alternate embodiment, the diodes 203a and 203b also prevent the flow of current from one smart battery in the battery panel to another when one battery has more charge than the another. In various embodiments, other mechanisms such as a high voltage differential may be used to ensure the unidirectional flow of current.

Figure 3:
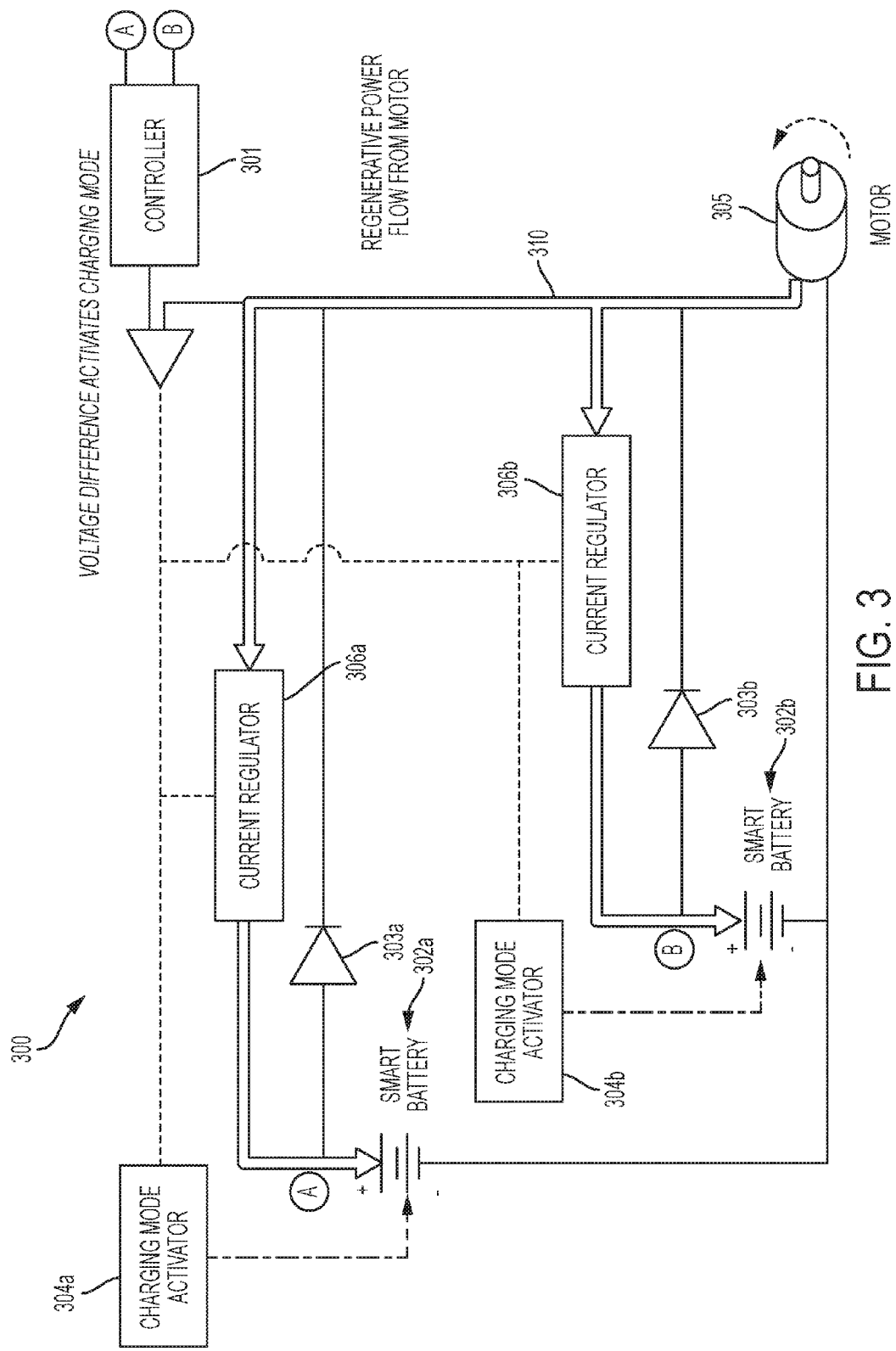
FIG. 3 illustrates an example block circuit diagram of the control system when a battery panel is receiving regenerative power from the motor of a vehicle, according to an embodiment.

FIG. 3 illustrates an example block circuit diagram 300 of a control system when a battery panel is receiving regenerative power from the motor of a vehicle. As shown in FIG. 3, the control system advantageously includes a controller 301 to monitor and control the charging of individual batteries in a battery panel. A controller may be a digital controller, an analog controller or circuit, an integrated circuit (IC), a microcontroller, formed from discrete components, or the like. The controller 301 may include or be coupled to various sensors and circuits (e.g., via inputs A and B from batteries 302a and 302b) to closely monitor a state of charge and/or a state of discharge of each battery 302a and 302b in a battery panel. The state of charge of a battery may be determined based on its terminal voltage, current input/output parameters, and/or battery temperature, and may be tracked for an extended period of time. In an embodiment, a smart battery includes electronics that can keep track of stored energy, or state-of-charge, in the smart battery.

In an embodiment, the controller 301 may also include or be coupled to various sensors and circuits that receive and/or sense the amount of current (or power) provided by a motor 305 during regenerative power flow. In various embodiments, the controller 301 may store, in a memory unit, and/or receive from an external database various characteristics of each of the batteries in a battery panel. Examples of characteristics may include, without limitation, an identification of the battery type, maximum charge current, maximum voltage, maximum rate of charging, maximum charge that can be stored, or the like, associated with a battery.

In an embodiment the controller 301 may be configured to detect regenerative power flow in the main power bus line 310, and dynamically switch the circuit from discharging mode (power being supplied to the motor) to charging mode (regenerative power being supplied by the motor). In a charging mode, the controller dynamically controls charging of the smart batteries in the battery panel, as discussed below with respect to FIG. 4. Hence, the controller 301 protects the batteries in the battery panel from a sudden influx of current when the motor starts delivering regenerative power.

Figure 5:
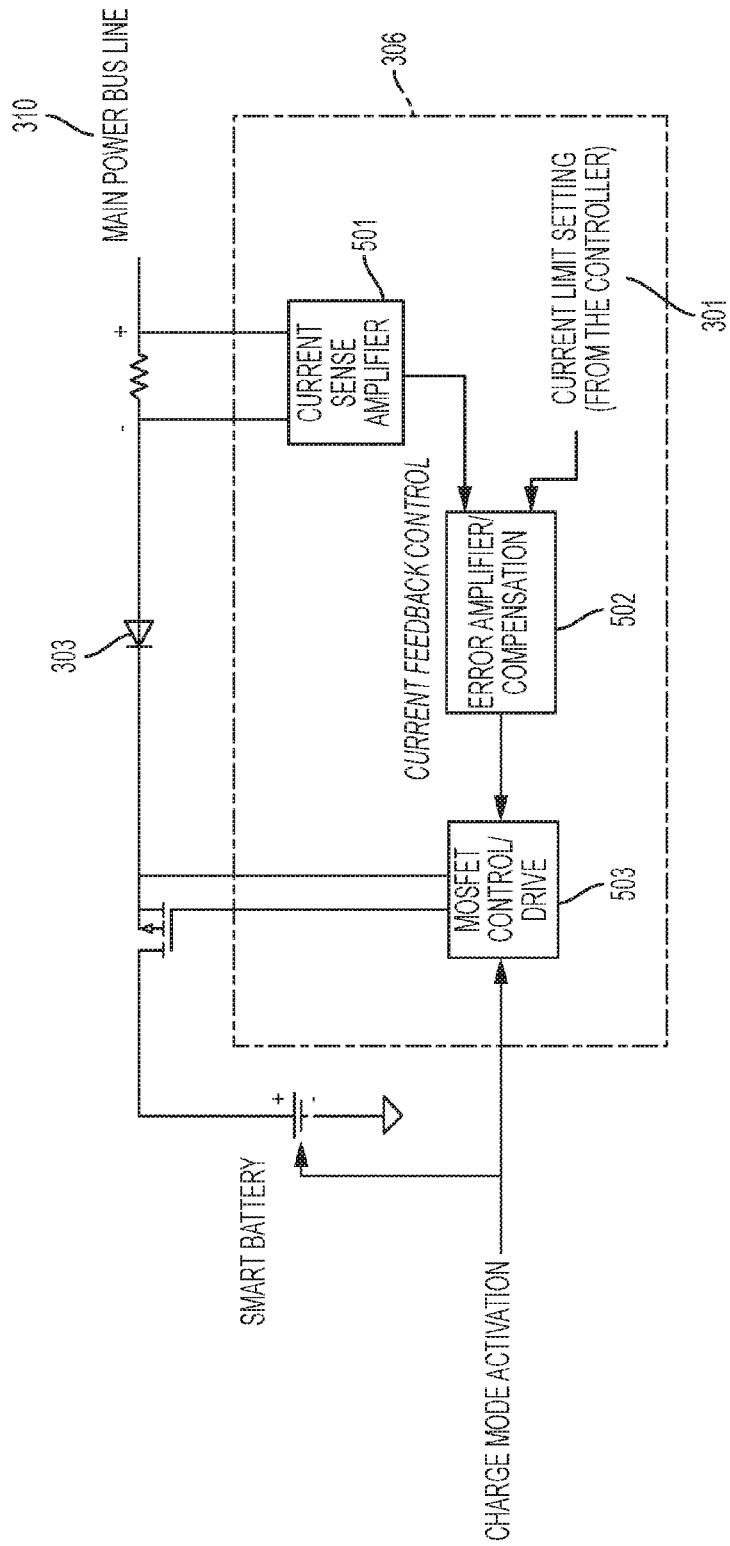
FIG. 5 illustrates an example circuit diagram of a current regulator, according to an embodiment.

In both modes, the controller 301 also prevents charging of one battery in the battery panel by another in case of a charge mismatch. In an embodiment, hysteretic control can be used for activation of charging mode of a battery to prevent battery to battery charging, and to ensure that a battery is charged only using regenerative power. Specifically, during regenerative power flow current in the power bus line 310 may be increased until it exceeds the threshold for activation of charging mode above the highest voltage battery in the battery panel, and is then automatically turned off when the voltage differential diminishes to a low cutoff (i.e., when the main power bus line voltage is still slightly higher than that of the highest voltage battery). Hence, the voltage drop across a diode of the highest voltage battery in the battery panel can be used by the control circuit for identifying when regenerative current goes away. As shown in FIG. 5, in an embodiment, a diode 303 is configured to control the direction of flow of current from the main power bus line to the battery (i.e., unidirectional current flow) and to produce a minimum voltage drop while regenerative current is present.

In various embodiments, the controller 301 may also include a comparator circuit (not shown here). The comparator circuit can analyze the characteristics of each of the batteries in a battery panel, the amount of current provided by the motor 305 during a regenerative power flow cycle, and/or a state of charge of a battery to determine an optimal voltage differential to be applied across (and/or maximum current to be provided to) each of the batteries in a battery panel during regenerative power flow from the motor 305. In an embodiment, the comparator circuit can adjust the optimal voltage differential values (and/or maximum current to be provided to) for each of the batteries in real time based on the above factors. Alternatively and/or additionally, the comparator circuit can also take into account other factors such as the location of a vehicle, the function a vehicle is performing, or the like, to determine the optimal voltage values for each of the batteries. For example, in an embodiment, the controller may use the location of a vehicle (determined using a GPS or other location tracking device of the vehicle) to determine the distance to a nearest charging station, and may use the voltage differential to maximize the battery life until the vehicle can reach the nearest charging station.

In an embodiment, the control system will include a current regulator (e.g., 306a and 306b) associated with each of the batteries (302a and 302b, respectively) in a battery panel. A current regulator may be an analog circuit, an integrated circuit (IC), or formed from discrete components, or any other type of regulator. The current regulator may be, for example, a switching type regulator (e.g., a boost regulator, a buck regulator, or the like) which generates a pulse width modulated (PWM) signal at its output. The current regulator may optionally be a linear voltage regulator whose output of the current is controlled by way of a feedback loop using a sensing resistor and a microcontroller, as is known to those skilled in the art. Other types of now or hereafter known current regulators are within the scope of this disclosure.

An example of a current regulator circuit 306 is provided in FIG. 5. In an embodiment, the current regulator of a battery may be in communication with the controller 301. In the absence of regenerative power, the controller can send a "switch off" signal to the current regulator circuit. When a current regulator circuit receives the "switch off" signal, it prevents the flow of current in any direction. Hence, no current flows through the current regulator circuit when it is switched off. The controller can also provide a "switch on" signal to current regulator upon detecting regenerative power in the power bus line 310. When a current regulator circuit receives the "switch on" signal, it is activated to allow current to flow from the power bus line to its associated battery. Furthermore, a current regulator may be configured to regulate the current supplied to its associated battery based on the optimal voltage differential values (and/or maximum current values) received from the controller 301, and hence regulates the current flow.

As shown in FIG. 5, a current sense amplifier 501 is used to output a voltage proportional to the current flowing in the power line 310. In an embodiment, component 502 may include an error amplifier and/or a compensating circuit for comparing the current limit setting (i.e., a reference current based on the charge status of the battery associated with the current regulator) to the voltage outputted by 501 (i.e., proportional to the sensed regenerative current in the power bus line), and regulating the current flow through the gate driver 503. In an embodiment, the gate driver 503 may be a MOSFET control/driver.

In an embodiment, the control system can also include a charging mode activator (e.g., 304a and 304b) associated with each of the batteries (302a and 302b, respectively) in a battery panel. A charging mode activator may activate a charging mode in an associated smart battery, in response to getting a command from the controller 301. For example, if the controller 301 determines that the charge of a battery has fallen below a threshold level and regenerative power is being supplied by a motor, it may instruct the charging mode activator of the battery to activate its charging mode. An optimal voltage differential is used to drive the charging current into a battery, and is hence used to regulate the charging current for each battery.

In an embodiment, the regenerative power from the motor flows as current through a current regulator to the associated smart battery, as shown in FIG. 3. In an embodiment, the controller 301 also prevents the flow of current from one smart battery in the battery panel to another.

It should be understood to those skilled in the art that the illustration of two batteries the above circuits 200 and 300 is merely provided as an example, it being understood that other configurations could provide for two, six, eight or more batteries without deviating from the principles of this disclosure. It should also be noted that the illustration of two batteries connected in parallel is also by way of example only and the principles of the current disclosure may similarly be applied to smart batteries connected in series.

In an embodiment, the controller 301 may also be in communication with the brake system of a vehicle to control or assist braking operations. For example, the brake system may include both a regenerative braking mechanism and a frictional braking mechanism. Since the frictional braking mechanism does not restore energy to the batteries, the regenerative braking mechanism is prioritized to maximize energy recovery when the controller 301 determines that any of the batteries in the system require charging (as discussed below).

Figure 4:
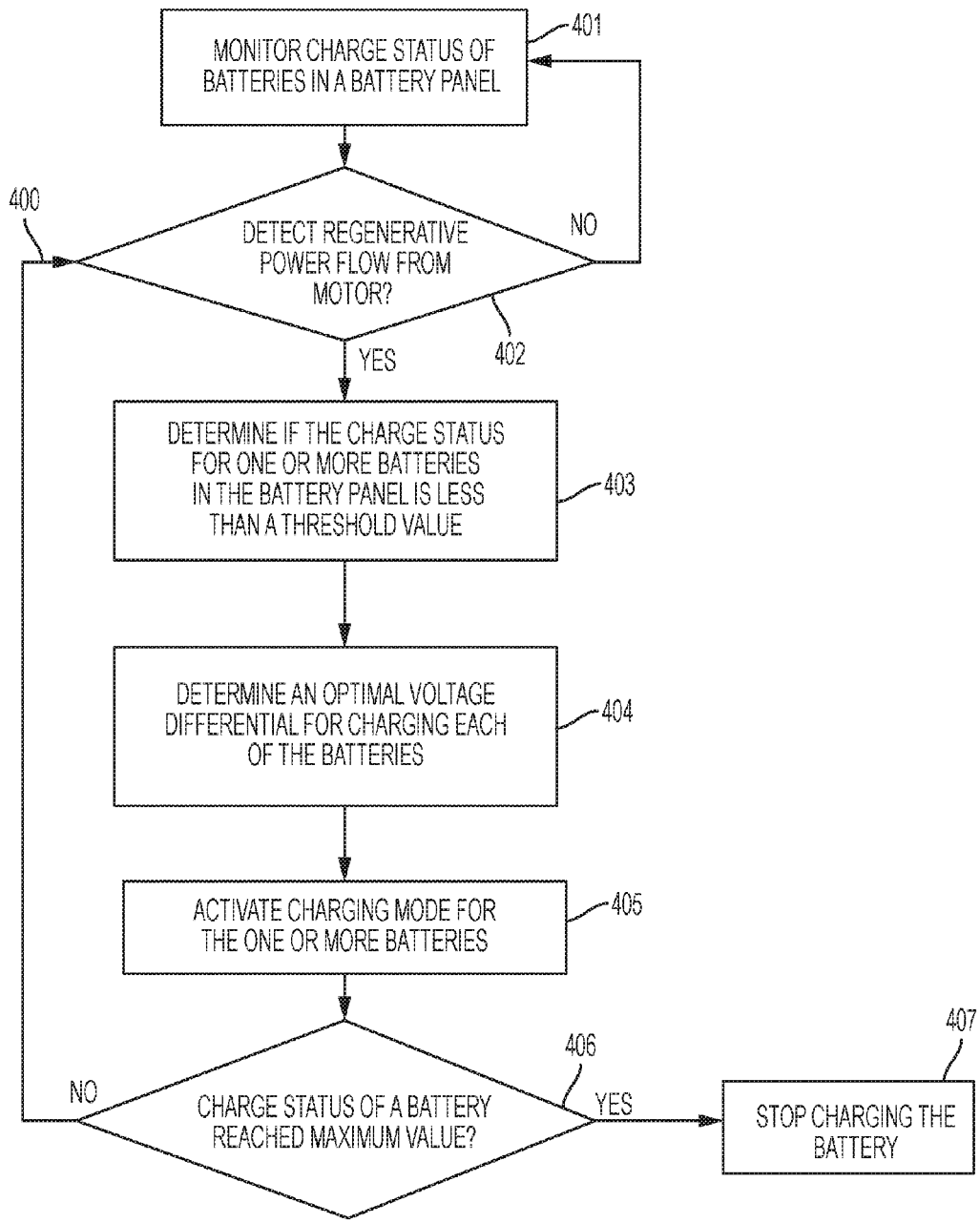
FIG. 4 illustrates an example flowchart method for controlling the recharging of smart batteries in a battery panel, according to an embodiment.

FIG. 4 illustrates an example flowchart method for controlling the regenerative charging of a battery panel that includes multiple smart batteries in a remote vehicle, using the regenerative power system of the current disclosure. In step 401, the system can continuously monitor the charge status of individual batteries in a battery panel. As discussed above, the charge status of a battery may be determined based on its terminal voltage, current input/output parameters, battery temperature, and/or smart battery charge status indicator unit, or the like, and may be tracked for an extended period of time.

In step 403, in response to detecting 402 regenerative power flow (and/or regenerative current flow) from a motor of the vehicle (e.g., during braking and/or deceleration), the system can determine if the charge status for one or more batteries in the battery panel is less than a threshold value. The system can select the one or more batteries in the battery panel whose charge status is less than a threshold value for charging using the regenerative power from the motor. In an embodiment, the threshold value may be the same for all the batteries in the battery panel. In an alternate embodiment, the threshold value may be different for different batteries in the battery panel.

In an embodiment, the threshold value may be indicative of the maximum charge a battery can hold, a minimum charge of a battery, any charge value between the minimum and maximum values (such as for example, 10%, 20%, 70% of the maximum charge value, or the like), or a combination thereof. For example, the system can select one or more batteries whose charge status is below their maximum charge values for charging using the regenerative power from the motor. Alternatively and/or additionally, the system can select only those batteries whose charge status has reached a minimum value for charging using the regenerative power from the motor. Alternatively and/or additionally, the system can only select those batteries whose charge status is at or below a threshold value between the minimum charge value and the maximum charge value for charging using the regenerative power from the motor. The system can determine the threshold value based on a type of battery, a type of vehicle, an amount of regenerative power being supplied by the motor in a cycle (i.e., over a pre-defined period of time, regenerative power phase, or the like), an application of the vehicle, user instructions, or the like.

In an embodiment, the system can use charge status to determine a priority list (or sequence) of charging of one or more batteries in the battery panel. For example, a priority of charging can be inversely proportional to the amount of charge in a battery.

In step 404, the system can determine an optimal voltage differential (and/or maximum current to be supplied) for charging each of the batteries in the battery panel. As discussed above, the system can determine the optimal voltage differential based on the current charge status of a battery, the battery characteristics, and/or the amount of regenerative power being supplied by a motor in a cycle. For example, if in an embodiment, one or more of the batteries in a battery panel are at their maximum charge values, the system may determine the optimal voltage differential for such batteries to be close to zero so as to prevent overcharging of the batteries. In another example, if one or more of the batteries in a battery panel are below their maximum charge values, the system may determine the optimal voltage differential for such batteries to be close to a value that provides the maximum current that a battery can absorb based on the battery characteristics.

Alternatively and/or additionally, the system can use the priority of charging to determine a voltage differential across various batteries in the battery panel. For example, a battery with a lower current charge status may be provided with a higher voltage differential compared to a battery with a higher current charge status such that the battery with a lower current charge status may be charged at a faster rate than that of the battery with the higher current charge status. It should be noted that the voltage differential will never be more than a value that provides the maximum current that a battery can absorb based on the battery characteristics. This will eventually lead to a uniform charge status across all the batteries in a battery panel because each battery can draw its optimum electrical current during the charging cycle independent of the other battery cells being charged. In an embodiment, all the regenerative power supplied by a motor may not be absorbed by the batteries and may be allowed to dissipate using various mechanisms known to those skilled in the art.

In an embodiment, the system can use the priority of charging to determine a voltage differential across various batteries in the battery panel if it determines that the amount of regenerative power being supplied by a motor, in a cycle, is not enough to sustain maximum allowed charging rates for all the batteries that require charging and/or is not going to be enough to completely charge all the batteries that require charging.

In step 405, the system can automatically activate charging mode for the batteries selected for charging using the regenerative power from the motor. In embodiment, the charging mode can also be activated based on a determination that the voltage produced by a motor during a regenerative power cycle is greater than a measured output voltage of a battery that needs charging.

In an embodiment, the system can continuously monitor the charge status of various batteries in a battery panel to determine 406 whether the charge status of a battery has reached a maximum charge value. In an embodiment, the maximum value corresponds to the maximum charge a battery can hold. If, for a battery, it is determined that maximum charge value has not been reached, the system continues to charge the battery using regenerative power flow. However, if the system determines that maximum charge value for a battery in the battery pack has been achieved (i.e., the battery is fully charged), the system will stop 406 charging the fully charged battery when charge status of the battery reaches a maximum value, by deactivating the charging mode. As shown in FIG. 4, the system also stops charging the batteries in the battery pack when the regenerative power flow from the motor stops. In an embodiment, the system can also vary the voltage differential across a battery in real time depending on its charge status with respect to other batteries if the priority of charging of a battery changes over time (as discussed above for voltage differential based on priority). In an embodiment, each group of smart batteries (i.e., each battery panel) may be recharged independently from the other groups.

Furthermore, the above method for controlling the regenerative charging smart batteries in a battery panel allows for removal, replacement, and/or repair of individual batteries from the battery panel without modifying and/or hampering the controller 301 functions.

Although the invention has been illustrated and described with respect to one or more implementations, equivalent alterations and modifications will occur to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

We claim:

1. A method of controlling regenerative charging of a battery panel in a remote vehicle, the method comprising:
continuously monitoring a state of charge of each of a plurality of smart batteries included in a battery panel;
detecting a regenerative current flow from a motor of a vehicle;
determining if a current charge status of a smart battery in the plurality of smart batteries is at a charge condition which is less than a threshold value associated with the smart battery;
determining a plurality of optimal voltage differentials to be applied across each of the plurality of smart batteries, wherein each of the plurality of optimal voltage differentials is used to control a charging current supplied to a corresponding smart battery; and
applying the determined plurality of optimal voltage differentials across each of the corresponding plurality of smart batteries.

2. The method of claim 1, further comprising dynamically switching the plurality of smart batteries to a charging mode in response to detecting the regenerative current flow from the motor; and
switching the plurality of smart batteries to a power supply mode when the regenerative current flow from the motor stops.

3. The method of claim 1, wherein monitoring a state of charge of a plurality of smart batteries comprises one or more of the following:
monitoring a terminal voltage across each smart battery;
monitoring current input or output parameters of each smart battery
monitoring temperature of each battery; or
receiving battery status information from each battery.

4. The method of claim 1, wherein the threshold value is one or more of the following:
a maximum charge value of the smart battery;
a minimum charge value of the smart battery; or
a charge value between the maximum charge value of the smart battery and the minimum charge value of the smart battery.

5. The method of claim 1, wherein determining a plurality of optimal voltage differentials to be applied across each of the plurality of smart batteries comprises:
receiving battery characteristics associated with each of the batteries;
using the received battery characteristics and the current charge status of each battery to determine the optimal voltage differential.

6. The method of claim 5, wherein the battery characteristics associated with each of the batteries comprise one or more of the following:
a type of a smart battery;
a maximum charge current of the smart battery;
a maximum voltage of the smart battery;
a maximum rate of charging of the smart battery; or
a maximum charge that can be stored in the smart battery.

7. The method of claim 6, wherein:
the battery characteristics associated with each of the batteries comprise the maximum charge current of the smart battery; and
determining the optimal voltage differential comprises determining a voltage differential such that current supplied to the smart battery does not exceed the maximum charge current of the smart battery.

8. The method of claim 1, further comprising:
activating a charging mode associated with a smart battery in the plurality of smart batteries that is at a charge condition which is less than a threshold value associated with the smart battery;
applying an optimal voltage differential across the smart battery that enables supply of a charging current from the regenerative current flow to the smart battery.

9. The method of claim 8, wherein activating the charging mode further comprises determining that a voltage produced by the motor during the regenerative current flow is greater than a measured output voltage of the smart battery.

10. The method of claim 1, further comprising:
using the state of charge of each of the plurality of smart batteries included in the battery panel to determine a priority list for charging the plurality of smart batteries; and
using the priority list to determine the plurality of optimal voltage differentials to be applied across each of the plurality of smart batteries.

11. The method of claim 10, wherein the priority list comprises a priority associated with each of the plurality of smart batteries that is inversely proportional to its charge value.

12. The method of claim 1, further comprising:
determining that a smart battery in the plurality of smart batteries is at a charge condition that is not less than a threshold value associated with the smart battery; and
applying an optimal voltage differential across the smart battery that prevents excessive charging of the smart battery.

13. A battery recharging control system comprising:
a motor configured to supply regenerative current for recharging one or more of a plurality of smart batteries included in a battery panel;
a control circuit for selectively controlling the recharging of one or more of the plurality of smart batteries, wherein the control circuit is configured to:
continuously monitor a state of charge of each of the plurality of smart batteries, detect a regenerative current flow from the motor,
determine if a current charge status of a smart battery in the plurality of smart batteries is at a charge condition which is less than a threshold value associated with the smart battery, and
determine a plurality of optimal voltage differentials to be applied across each of the plurality of smart batteries, wherein each of the plurality of optimal voltage differentials is used to control a charging current supplied to a corresponding smart battery; and
a plurality of regulator circuits associated with each of the plurality of smart batteries, communicatively coupled to the control circuit, wherein each of the plurality of regulator circuits is configured to control a charge current supplied to the associated smart battery.

14. The battery recharging control system of claim 13, wherein the motor is coupled to a chassis of an unmanned ground vehicle, and the battery panel is used to supply power to the unmanned ground vehicle.

15. The battery recharging control system of claim 13, further comprising an activator circuit configured to activate a charging mode associated with a smart battery in the plurality of smart batteries that is at a charge condition which is less than a threshold value associated with the smart battery; and
wherein the regulator circuit is further configured to apply an optimal voltage differential across the smart battery that enables supply of a charging current from the regenerative current flow to the smart battery.

16. The battery recharging control system of claim 13, wherein activating the charging mode, by the actuator circuit, further comprises determining that a voltage produced by the motor during the regenerative current flow is greater than a measured output voltage of the smart battery.

17. The battery recharging control system of claim 13, wherein the control circuit is configured to monitor a state of charge of a plurality of smart batteries using one or more of the following:
monitoring a terminal voltage across each smart battery;
monitoring current input or output parameters of each smart battery
monitoring temperature of each battery; or
receiving battery status information from each battery.

18. The battery recharging control system of claim 13, wherein the control circuit is further configured to:
use the state of charge of each of the plurality of smart batteries included in the battery panel to determine a priority list for charging the plurality of smart batteries; and
use the priority list to determine the plurality of optimal voltage differentials to be applied across each of the plurality of smart batteries.

19. The battery recharging control system of claim 13, wherein the control circuit is further configured to:
determine that a smart battery in the plurality of smart batteries is at a charge condition that is not less than a threshold value associated with the smart battery; and
apply an optimal voltage differential across the smart battery that prevents charging of the smart battery.

20. The battery recharging control system of claim 13, wherein the plurality of batteries are included in battery tray, and wherein one or more of the plurality of batteries can be added or removed without disrupting the control circuit.

21. The battery recharging control system of claim 13, further comprising a plurality of diodes associated with each of the plurality of smart batteries, wherein each of the plurality of diodes is configured to prevent the flow of current to the associated smart battery from:
the motor in absence of a regenerative current; or
from another smart battery to the associated smart battery.

* * * * *